May 21, 1940.  M. TIBBETTS  2,201,932

METHOD OF ASSEMBLING VIBRATION DAMPERS

Original Filed June 5, 1933   3 Sheets-Sheet 1

Inventor
Milton Tibbetts
By Watson, Coit, Morse & Grindle
Attorney

May 21, 1940.　　　M. TIBBETTS　　　2,201,932
METHOD OF ASSEMBLING VIBRATION DAMPERS
Original Filed June 5, 1933　　　3 Sheets-Sheet 2
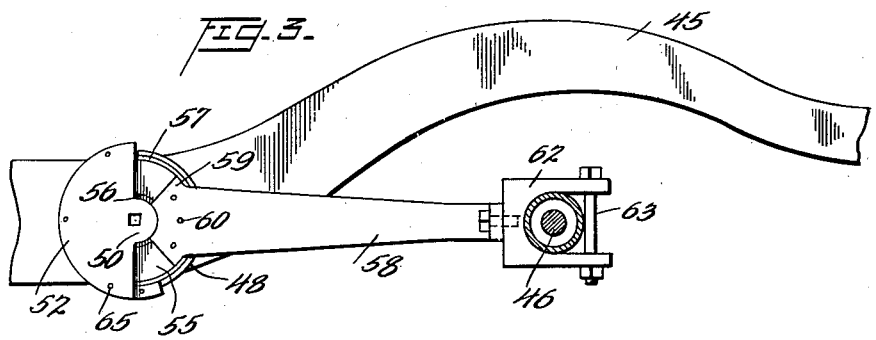
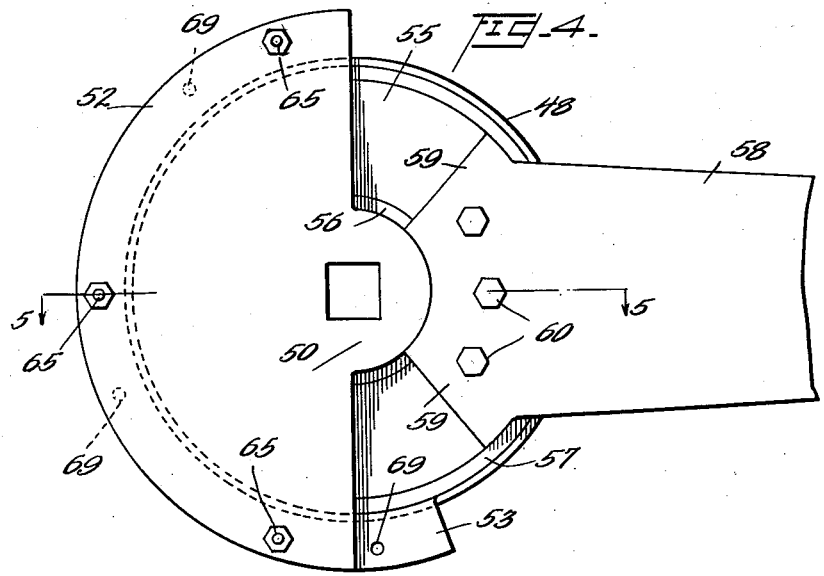
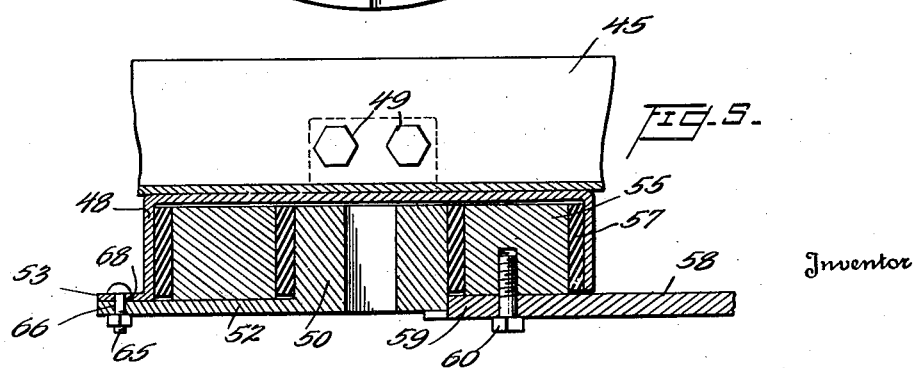
Inventor
Milton Tibbetts
By Watson, Cait, Morse & Grindle
Attorney May 21, 1940. M. TIBBETTS 2,201,932
METHOD OF ASSEMBLING VIBRATION DAMPERS
Original Filed June 5, 1933 3 Sheets-Sheet 3
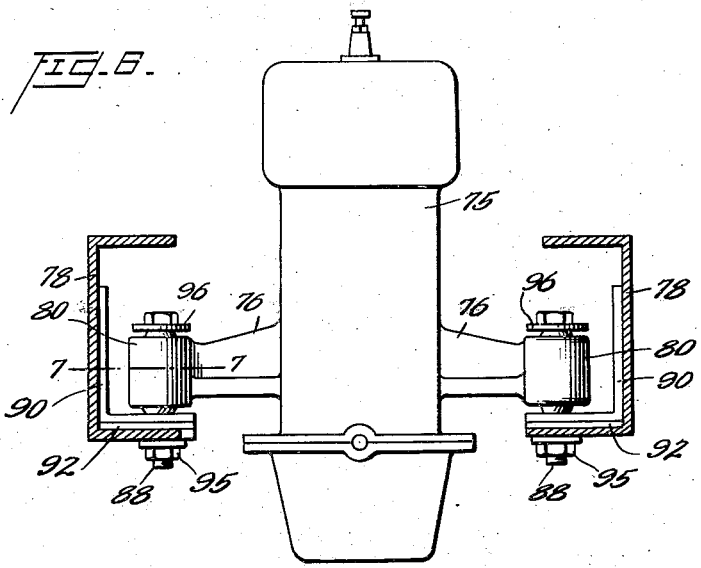
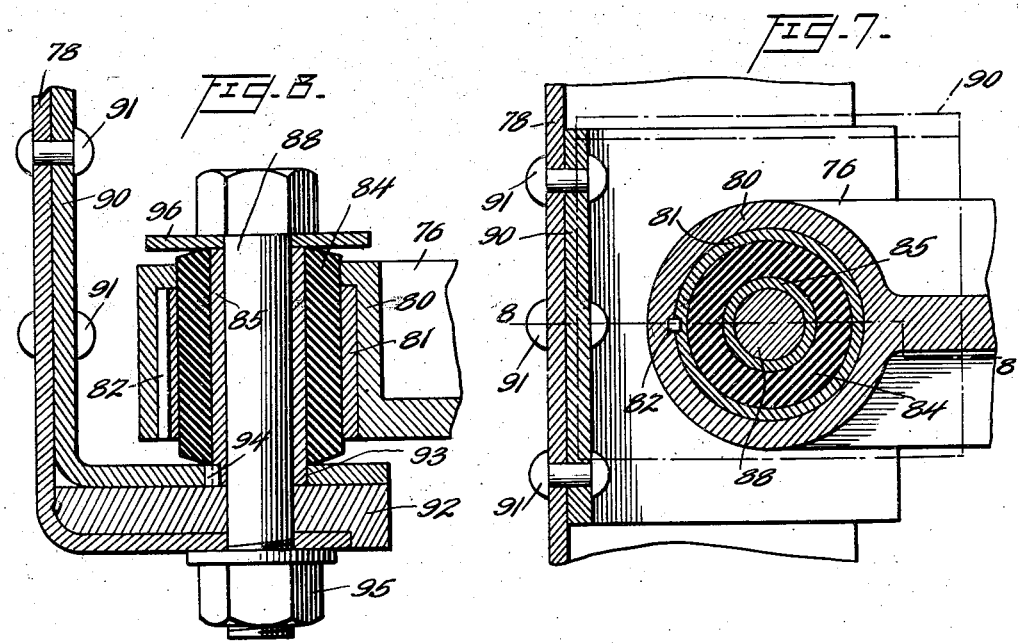
Inventor
Milton Tibbetts
By Watson, Cait, Marre & Grindle
Attorney Patented May 21, 1940

2,201,932

UNITED STATES PATENT OFFICE 2,201,932

METHOD OF ASSEMBLING VIBRATION DAMPERS

Milton Tibbetts, Detroit, Mich., assignor to Packard Motor Car Company, Detroit, Mich., a corporation of Michigan Original application June 5, 1933, Serial No. 674,460. Divided and this application June 19, 1936, Serial No. 86,201

8 Claims. (Cl. 29—84)

This invention relates to vibration absorbing devices and is particularly concerned with the damping of vibrations occurring in motor vehicles such as result from road shock or from the periodic impulses applied to the crankshaft of an internal combustion engine. It is the principal object of the invention to improve the operation of vibration dampers particularly as regards the absorption and dissipation of vibrations of small amplitude and high frequency such as are developed by high speeds of operation of modern internal combustion engines and motor vehicles. The present application is a division of my prior application Serial No. 674,460, filed June 5, 1933, Patent No. 2,073,661.

The materials composed in part or entirely of rubber and similar substances have found wide employment in the field of vibration damping by reason of the high mechanical hysteresis which they exhibit, such materials being characterized by the development of considerable heat internally when subjected to distortion. Thus in vibration dampers for crankshafts, rubber has been successfully used as the resilient element for effecting the yieldable connection between the shaft and the relatively movable inertia member, the vibrations in the shaft serving to deform the rubber, whereby the vibrational energy is dissipated in the form of heat. Difficulty has been experienced, however, due to the failure of the rubber to respond to vibrations of small amplitude and extremely high frequency as the result of the extreme yieldability of the rubber, the degree of deformation of the rubber being insufficient to develop the necessary internal friction. The present invention contemplates the improvement of the behavior of rubber and similar materials when employed in this manner by maintaining the same in a state of tension, the rubber acting more quickly and developing greater internal friction when stretched.

Thus it is a more specific object of the invention to provide a vibration absorbing device employing two relatively movable members which are yieldably connected by an elastic deformable means such as rubber or the like in which an initial tensile or shearing stress is applied to the rubber, this stress being maintained during the normal functioning of the device. The invention may find employment in various types of vibration absorbing devices such as the conventional vibration dampers for crankshafts or shock absorbers acting between the axles and the frame of a motor vehicle. In the preferred embodiments of the invention, the rubber in the form of relatively thin sheets is interposed between contiguous relatively movable surfaces of the two members of the vibration absorbing device and is vulcanized to each. In order that the initial tension of the rubber may be readily applied and maintained one of the relatively movable members comprises two relatively displaceable elements, a sheet of rubber being interposed between each of these elements and the other member. Thus when the two elements are displaced with respect to each other and are secured in the relatively displaced positions the tension thus applied to the rubber is maintained independently of the relative movement of the two members during the normal functioning of the device.

Further objects and features of the invention will be apparent from the following description taken in connection with the accompanying drawings, in which:

Figure 3 is a side elevation of a portion of a vehicle frame illustrating the application of the invention to a vehicle suspension means or shock absorber;

Figure 4 is an enlarged elevational view of the shock absorber illustrated in Figure 3;

Figure 5 is a section on the line 5—5 of Figure 4;

Figure 6 is a transverse sectional view of a vehicle frame illustrating the application of the invention to a motor support;

Figure 7 is a fragmentary sectional view taken substantially on the line 7—7 of Figure 6; and Figure 8 is a section taken on the line 8—8 of Figure 7.

Figure 1:
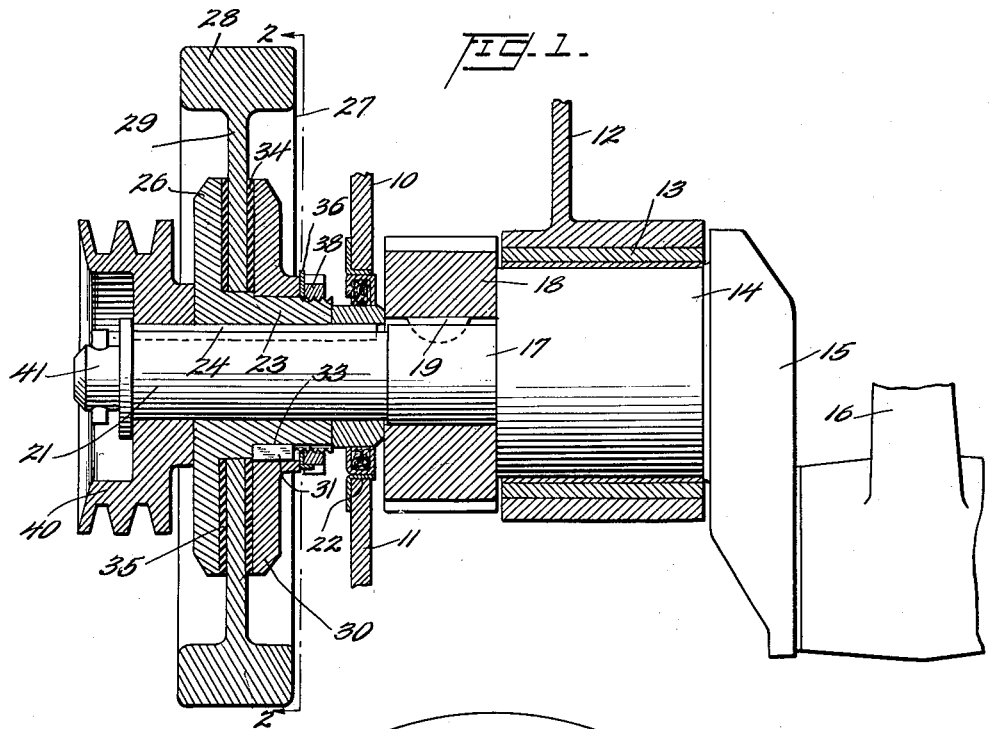
Figure 1 is a longitudinal sectional view of a vibration damper for a crankshaft constructed in accordance with the principles of the invention.

In order to facilitate an understanding of the invention, the embodiments thereof illustrated in the drawings are described herein in detail. It will nevertheless be understood that no limitation is intended by the use of specific language and that such alterations of the structure disclosed are contemplated as fall within the spirit and scope of the invention.

Figure 2:
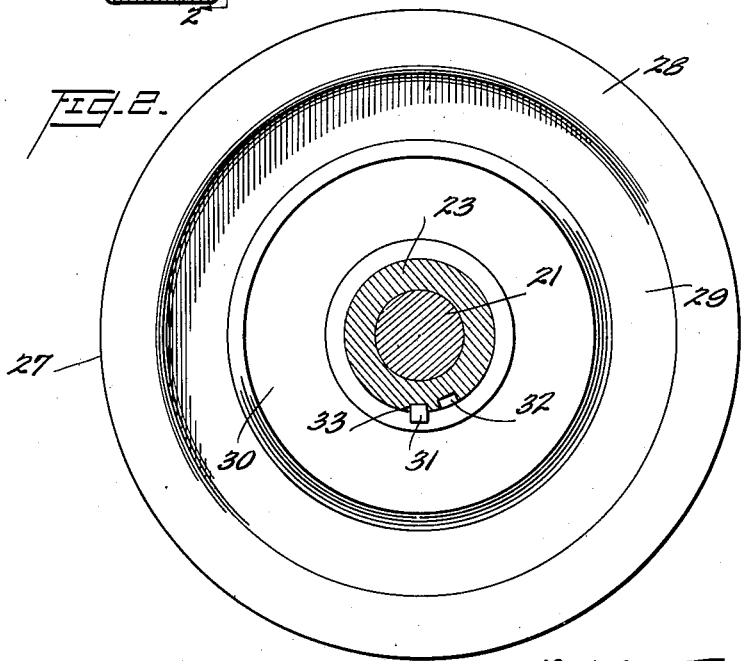
Figure 2 is a transverse section on the line 2—2 of Figure 1.

Referring now to Figures 1 and 2 of the drawings, it will be observed that the numeral 10 represents the crank case of an internal combustion engine, having a lower cover or oil pan 11 and provided with transverse webs as shown at 12. The webs 12 support suitable aligned bearings 13 for an engine crankshaft 14, which is provided with the usual integral cranks 15, each crank being connected by a connecting rod 16 to a piston mounted in one of the engine cylinders. The pistons and cylinders are not shown in the drawings but are of the usual construction.

Forwardly of the first bearing 13, the crankshaft 14 is preferably formed with a reduced portion 17, on which a gear or chain sprocket 18 may be keyed or otherwise secured as indicated at 19, and used to drive the engine camshaft or other engine accessories, which are not shown in the drawings. Forwardly of the sprocket 18, the crankshaft is preferably further reduced in size as shown at 21, and projects through a suitable opening 22 in the front wall of the crank case 10.

The vibration damper is illustrated as mounted at or adjacent the forward end of the crankshaft 14 and comprises a supporting portion or hub 23 keyed or otherwise rigidly secured to the crankshaft on the reduced portion thereof as indicated at 24, the hub 23 being provided with a radially disposed integral flange 26. Surrounding the hub 23 and concentric with the crankshaft axis, is an inertia member 27 having a web portion 29 and a rim portion 28, the latter being enlarged as desired to increase the inertia effect. An annular flanged element 30 surrounds the hub 23 and is secured for rotation therewith, for instance by the key 31 fitting in the keyway 33, it being observed that the flanged element 30 and the flange 26 of the hub 23 are spaced axially of the shaft to accommodate the web portion 29 of the inertia member therebetween, the inertia member being preferably journalled on the hub 23.

Annular sheets of rubber, rubberized fabric, or similarly acting material, 34 and 35 are interposed between the web portion 29 of the inertia member and the opposed contiguous faces of the flanged element 30 and the flange 26, the rubber being vulcanized or otherwise surface bonded as by cementing to these opposed faces and to the web portion 29 of the inertia member. The outer portion of the hub 23 is threaded as indicated at 37 to receive a nut 38 which engages the flanged element 30 through an interposed washer 36 to retain the element 30 against axial displacement. Under some conditions it may be desirable to thread the nut 38 on the hub 23 to an extent sufficient to effect some degree of compression of the rubber sheets 34 and 35 to further affect the characteristics of the rubber, it being understood, however, that the principal alteration of the characteristics of the rubber is obtained in accordance with the present invention by the circumferential tensioning of the rubber which may be varied to some extent by simultaneous axial compression thereof, for instance for the purpose of obtaining accurate adjustment of the tension to which the rubber is subjected to precisely control the characteristics of the damper.

In order that the desired tension may be readily applied to the rubber the following method is preferably observed in assembling the damper. The hub 23, the rubber sheets 34 and 35, the inertia member 27, and the flanged element 30 are first assembled in the manner indicated in Figure 1 of the drawings with the exception that the element 30 is so positioned on the hub that the key 31 which prevents relative rotation thereof may be inserted in the keyway 32, it being observed from Figure 2 that the two keyways 32 and 33 are spaced circumferentially of the hub 23. The nut 38 is then threaded in position and the rubber sheets are vulcanized to the contiguous surfaces of the inertia member and the shaft carried member. On the completion of the vulcanization the nut 38 is removed, the key is withdrawn from the keyway 32, and the flanged element 30 is rotated to an extent sufficient to permit the introduction of the key in the keyway 33. The nut 38 is then replaced and it is apparent by reason of the rotation of the flanged member 30, the rubber sheets 34 and 35 have been placed under tension by the shearing stress applied thereto and will be maintained permanently in a condition of deformation.

The damper is thus assembled in the form of a unit which may be slid on the forward end of the crankshaft and retained thereon against axial displacement by means of the pulley 40 which is in turn held on the shaft by the usual nut 41 which forms a coupling for engagement by the starting crank.

It will be evident that upon the occurrence of relative movement between the inertia member 27 and the shaft with its hub member 23 as the result of vibrations induced in the shaft, those portions of the rubber sheets 34 and 35 which are bonded to the hub member 23 and the flanged element 30 will be forced to partake of movement with the shaft, whereas such portions of the rubber sheets as are united to the inertia member will partake of the movement of the latter and the rubber sheets will be considerably distorted, causing a considerable loss of energy by hysteresis or internal friction with resultant damping of vibrations. As hereinbefore pointed out, the ability of the rubber to respond to vibrations of high frequency and small amplitude is intensified to a marked extent by reason of the permanent state of tension in which it has been placed.

Referring now to the form of the invention shown in Figures 3, 4, and 5, a portion of the side frame member 45 of the vehicle adjacent the rear axle 46 is illustrated, it being understood that the rear axle may be supported from the vehicle frame in any conventional manner to permit relative vertical movement of the axle and the frame when an irregular road bed is encountered. In order to prevent the development of synchronous movement of the frame and axle and to damp vibrations a shock absorbing device is connected between the axle and the frame. This device, as in the embodiment of the invention first described, comprises two relatively movable members and deformable elastic means such as rubber for resisting such relative movement. One of these members is secured to the frame and comprises two relatively displaceable elements, a substantially cup-shaped element 48 bolted to the side frame member as indicated at 49, and a hub element 50 having an annular sector-shaped flange 52 bolted to a flange 53 formed about a portion of the circumference of the element 48, these two elements providing an annular space 60 within which is received the annular member 55. Annuli 56 and 57 of rubber or the like are interposed between the member 55, the hub element 50, and the cup-shaped element 48 and are surface bonded to the contiguous opposed faces of these parts, for instance by vulcanization of the rubber. An arm 58 having a sector-shaped portion 59 is secured to the member 55, for instance by bolts 60, and is connected at its outer end with the axle 46, for instance by means of a bracket 62 embracing the axle housing and clamped in position thereon by bolts 63.

Returning now to the means for securing the cup-shaped element 48 and the flange 52 of the hub element 50 together, it will be observed that a plurality of bolts 65 are employed, these bolts passing through apertures 66 spaced circumferentially of the flange 52 and through one of two sets of apertures 68 and 69 in the flange 53. In assembling the device the procedure hereinbefore set forth with reference to the first form of the invention is substantially followed.

The cup-shaped element 48, the hub element 50, the member 55, and the rubber annuli 56, 57 are first placed in the positions shown in Figure 5 of the drawings and the bolts 65 are inserted through the apertures 66 in the flange 52 of the hub element 50 and through the aperture 69 in the flange 53 of the cup-shaped element. The rubber is then vulcanized in position, the bolts 65 are withdrawn, and the elements 48 and 50 are rotated with respect to each other to an extent sufficient to permit the introduction of the bolts 65 in the apertures 66 and 68, thus applying a shearing and tensile stress to the rubber annuli 56 and 57. It will be appreciated that the rubber will be maintained under tension independently of any tension which may be applied thereto as the result of assembly of the shock absorber in a vehicle; in other words, the two annuli are stretched in opposite directions and the two movable members of the device are thus placed in a state of equilibrium with the rubber under tension independently of the vehicle load. It is in fact preferable to so assemble the shock absorber on the assembled vehicle that the tensile stress initially applied to the rubber is unchanged under normal operating conditions.

As in the first described embodiment of the invention the initial deformation of the rubber alters its operating characteristics and improves its response, the device acting more quickly and being capable of dissipating a greater amount of vibrational energy than otherwise on the occurrence of relative vibratory movement of the axle and frame.

It will be understood that the shock absorbing device disclosed herein may be connected between other parts of the vehicle partaking of relative movement during operation and is capable of functioning properly under all conditions in which a conventional shock absorber might be employed, or alternatively the device may serve as a primary suspension means to yieldingly support the vehicle load in lieu of the conventional leaf spring suspension.

Referring now to Figures 6, 7 and 8 of the drawings, it will be observed that the invention is illustrated as applied to a motor support, the motor 75 being shown as provided with laterally extending arms 76 which may be formed integrally with the motor block or suitably secured thereto, these arms being carried by the side frame members 78 of the vehicle frame. The connection between the arms 76 and the side frame members is illustrated more particularly in Figures 7 and 8 of the drawings. Thus each arm 76 may be formed adjacent its outer end to provide an annular cup-shaped portion 80. A bushing 81 is fitted within the cup-shaped portion 80 and is keyed or otherwise secured against rotation therein as indicated at 82. An annular sleeve 84 of rubber or similar material is secured by cementing or vulcanization within the bushing 81 and a bushing 85 fitting within the sleeve 84 is likewise secured to the latter, the bushing 85 being adapted to receive a bolt 88.

An L-shaped bracket 90 is riveted as indicated at 91 to the side frame member 78, the lower leg of this bracket overlying the lower leg of the side frame member 78 to receive a spacing member 92 therebetween. The spacing member 92 and the lower leg of the side frame member 78 are apertured to receive the bolt 88 and the lower leg of the bracket 90 is provided with a somewhat larger aperture 93 to receive the lower end of the bushing 85, a key 94 or other non-rotative connection being provided between the bracket 90 and the bushing 85. A nut 95 is threaded on one end of the bolt 88 and a washer 96 is interposed between the head of the bolt and the upper end of the bushing 85.

In assembling each device, the bushings 81 and 85 may be first vulcanized to the rubber sleeve 84 and are inserted in position in the cup-shaped portion 80 of the arm 76 with the key 82 in place. The bracket 90 is then fitted on the lower end of the bushing 85 and the key 94 inserted, the keyways for the keys 82 and 94 being so disposed initially that the bracket 90 when thus assembled and prior to the application of tension to the rubber sleeve 84 lies substantially in the position in which it is shown in dotted lines in Figure 7, preferably at approximately 90° to the final full line position. The bracket 90 is now rotated from the dotted line to the full line position with the result that the rubber sleeve 84 is tensioned to a considerable extent. The motor and associated parts including both brackets 90 are then placed in position between the side frame member 78, the brackets 90 are bolted to the respective side frame members, the bolts 88 are inserted through the bushings 85, and the nuts 95 are tightened.

It will be appreciated that by this mode of assembly the rubber is initially tensioned, the tensile stress being applied thereto independently of the weight of the motor which is nevertheless directly carried on the rubber sleeves 84, the latter being deformed on occurrence of relative vibrational movement of the motor and the frame. This tensile stress is maintained by reason of the provision of the similar supporting devices at opposite sides of the motor, it being apparent that the arms 76 and brackets 90 can partake of no appreciable relative rotative movement once the motor has been placed in assembled position in the frame.

By varying the initial relative displacement of the keyways for the keys 94 and 82 which serve to connect the bushings 85 and 81 to the bracket 90 and the motor arm 76 respectively, it is obvious that the degree of tension applied to the rubber sleeve may be altered to suit the particular conditions of operation and to obtain the maximum effective response of the rubber to vibrational disturbances. In all three forms of the invention described herein the shearing or tensile stress initially applied to the rubber is not affected by relative movement of the elements of the device under operating conditions.

Having thus described the invention, what is claimed as new and desired to be secured by Letters Patent is:

1. A method of assembling a vibration damper for crankshafts of the type including a part fixed to the crankshaft and a part oscillatable about the crankshaft axis, one of said parts including two elements capable of rotative displacement with respect to each other and with respect to the other of said parts, said elements having opposing faces between which the other of said parts is located and having rubber positioned between said last named part and each of said elements, which comprises the steps of vulcanizing the rubber to the intermediate part and to said elements, thereafter displacing said elements with respect to each other to apply tension to the rubber, and securing the elements together to maintain the rubber under tension.

2. A method of assembling a vibration absorbing device of the type comprising two relatively moving parts, one of said parts including two elements having opposing faces between which the other of said parts is located and having means composed of rubber positioned between said last named part and each of said elements, which comprises the steps of surface bonding said means to the intermediate part and to said elements, thereafter displacing the elements with respect to each other to apply tension to said means, and securing the elements together in such displaced relation to maintain said means under tension.

3. A method of assembling a vibration absorbing device of the type comprising two relatively rotating parts, one of said parts including two elements having opposing faces between which the other of said parts is located and having rubber positioned between said last named part and each of said elements, which comprises the steps of vulcanizing the rubber to the intermediate part and to said elements, thereafter rotating said elements with respect to each other to apply tension to the rubber, and securing the elements together to maintain the rubber under tension.

4. A method of assembling a vibration absorbing device of the type which comprises two relatively moving parts connected through rubber, which includes the steps of manipulating the parts to apply an initial tensile stress to the rubber, and maintaining the rubber in the initial stressed condition independently of the relative movement of the parts when in operation.

5. A method of assembling a vibration absorbing device of the type comprising two relatively moving parts having rubber positioned between them, which comprises the steps of vulcanizing the rubber to the two parts, thereafter displacing the parts relative to each other to apply tension to the rubber, and retaining the parts in such displaced position independently of the application of an otherwise unsupported load thereto.

6. A method of assembling a vibration absorbing device of the type including two relatively moving parts, one of said parts including two elements, and deformable elastic means acting between the other of said parts and each of said elements, which comprises the steps of surface bonding said means to each of said elements and to the other of said parts, thereafter relatively displacing said elements to apply tension to said means and securing the displaced elements together to maintain such tension.

7. A method of assembling a vibration absorbing device of the type including two relatively moving parts, one of said parts including two elements, and deformable elastic means composed essentially of rubber acting between the other of said parts and each of said elements, which comprises the steps of vulcanizing said rubber to each of said elements and to the other of said parts, thereafter displacing said elements with respect to each other to apply tension to the rubber, and securing the elements together to maintain the rubber under tension.

8. A method of assembling a vibration damper for crankshafts of the type including two relatively oscillatable parts, one of said parts including two elements capable of relative rotative displacement with respect to each other and with respect to the other of said parts, and deformable elastic means acting between the other of said parts and each of said elements, which comprises the steps of surface bonding said means to each of said elements and to the other of said parts, thereafter relatively rotating said elements to apply tension to said means, and securing the rotated elements together against further relative rotation to maintain such tension.

MILTON TIBBETTS.